United States Patent Office 3,120,472
Patented Feb. 4, 1964

3,120,472
PRODUCTION OF L-GLUTAMIC ACID AND
α-KETOGLUTARIC ACIDS
Cecil G. Dunn, Cambridge, Mass., George J. Fuld, Baltimore, Md., Boguslaw W. Kusmierek, Wilmington, Del., Peter G. Lim, Bloomsburg, Pa., and Daniel I. C. Wang, Boston, Mass., assignors, by mesne assignments, to Hercules Powder Company, Wilmington, Del., a corporation of Delaware
No Drawing. Filed Aug. 30, 1960, Ser. No. 52,755
7 Claims. (Cl. 195—47)

This invention relates to the biochemical production of organic acids. In one aspect it relates to the production of L-glutamic acid and α-ketoglutaric acid by cultivating microorganisms having certain characteristics (as defined hereinafter) in a nutrient medium under aerobic conditions, the medium including a carbohydrate source and a nitrogen source. More particularly, this invention relates to the production of these acids by one of such microorganisms which we have isolated as a new microorganism from farm soil. We have deposited this microorganism with the Americal Type Culture Collection (ATCC), and they have cataloged it under ATCC No. 13868. The characteristics given in Table 1 hereinafter are based on extensive studies and tests, including, e.g., cultural, morphological, nutritional, physiological, and biochemical, which we have carried out on this microorganism. We consider that these characteristics fit the genus Corynebacterium better than they do any other known genus. However, these characteristics do not correspond sufficiently to any known species of this genus. In view of the foregoing we have designated this particular and preferred microorganism of our present invention as belonging to Corynebacterium herculis spec. nov. It should be noted that the taxonomic area in which the microorganism ATCC No. 13868 and the other microorganisms of our invention are located has not been explored as extensively as some other taxonomic areas; therefore, it is to be understood that our invention is not limited to the use of microorganisms of any particular taxonomic designation except as set forth in the appended claims.

The present invention is applicable to the production of said organic acids with microorganisms characterized as aerobic, non-motile, non-acid fast, gram positive (by which term we mean to include gram variable), rod shaped bacteria which frequently are club shaped and often occur in angular arrangements. However, we have obtained best results with Corynebacterium herculis spec. nov., particularly in the production of L-glutamic acid. Also, at the present time L-glutamic acid is by far the more desirable acid commercially. In view of the foregoing and for the sake of clarity and simplicity, the present invention will be described hereinafter for the most part with respect to the preparation of L-glutamic acid employing Corynebacteriaum herculis spec. nov.

All known methods of making glutamic acid by chemical synthesis result in a racemic or 50:50 mixture of L-glutamic acid and D-glutamic acid which is substantially useless as such. Only the L-glutamic acid by itself is of practical value, but the problems involved in separating the two acids make separation quite costly. The monosodium salt of L-glutamic acid is widely used as a flavor enhancer.

The following examples illustrate various embodiments of the present invention, but they are not intended to limit the invention beyond the scope of the claims of this application. In all examples, except Examples 9–12, 100-ml. portions of an aqueous nutrient medium of about neutral pH in 500-ml. Erlenmeyer flasks were inoculated with 2-ml. portions of a liquid stock culture of the microorganism indicated and incubated at 28° C.–30° C. under areobic conditions on a rotary shaker with a speed of about 200 oscillations per minute and a 1-inch diameter rotary motion. The stock cultures were considered to contain approximately $10^9$ microorganisms per ml.

Where the pH of the nutrient medium is not shown in the following examples, pH adjustment was not made because the nutrient medium was already approximately neutral in reaction.

In the examples and elsewhere herein the composition of the nutrient medium is given as percent weight by volume except that the concentration of flour wash water is given as percent volume by volume.

The flour wash water is, among others, a source of growth-promoting factors, as discolsed in greater detail hereinafter. The flour wash water used is a by-product obtained in the well-known process of separating gluten and starch in flour by washing the flour with water. The flour wash water contains, among other things, soluble proteins, amino acids, vitamins, sugars, mineral salts, some material in the colloidal state, and some small starch granules. The flour wash water solids have the following approximate weight percent composition:

Protein [1] _____ 20
Sugar _____ 38
Starch _____ 20
Ash _____ 10
Unaccounted for _____ 12

[1] Nitrogen-containing materials calculated as proteins. Normally, the solids content of the flour wash water is about 1%. For these experiments, except Examples 3 and 9, this was concentrated to 5% solids by simple evaporation.

In the examples the following methods of analyses were used to determine the organic acids produced in accordance with this invention. An enzymatic method of analysis which involved a reaction catalyzed by L-glutamic acid decarboxylase and carried out in a Warburg apparatus was used to determine the L-glutamic acid produced. This is the method used by the Glutamate Manufacturing Association and is often referred to as the Warburg manometric method. This method is reported in Methods in Enzymology by Colowick and Kaplan, vol. 2, page 182, Academic Press, Inc., New York City (1955). The enzymatic method of analysis used to determine the α-ketoglutaric acid produced involved an enzyme-catalyzed transamination reaction between α-ketoglutaric acid and aspartic acid to yield glutamic acid and oxalacetic acid; oxalacetic acid was determined by photometric analysis at 280 millimicrons—J. Biol. Chem. 234 (1), page 51 (1959). The paper chromatographic method used to determine the L-glutamic acid produced utilized a solvent system of isopropyl alcohol, phenol and water and a developer of 0.1% ninhydrin in acetone solution; the color was developed upon heating. The paper chromatographic method used to determine the α-ketoglutaric acid utilized a solvent system of butyl alcohol, acetic acid and water and a developer of 0.2% o-phenylenediamine in ethyl alcohol solution containing 1% nitric acid; the color was developed on heating.

EXAMPLE 1

[Corynebacterium herculis spec. nov. ATCC No. 13868]

Composition of nutrient medium:                    Percent
    Glucose _____ 4.68
    $KH_2PO_4$ _____ 0.05
    $MgSO_4 \cdot 7H_2O$ _____ 0.02
    Concentrated flour wash water (5% solids) ___ 5.00
    Urea _____ 1.00

After 72 hours of fermentation the nutrient medium contained 18.6 mg. of L-glutamic acid per ml. of said medium.

EXAMPLE 2

[*Corynebacterium herculis* spec. nov. ATCC No. 13868]

Composition of nutrient medium:

| | Percent |
|---|---|
| Glucose | 0.936 |
| $KH_2PO_4$ | 0.05 |
| $MgSO_4 \cdot 7H_2O$ | 0.02 |
| Concentrated flour wash water (5% solids) | 5.00 |
| Urea | 1.00 |

After 72 hours of fermentation the nutrient medium contained 4.15 mg. of L-glutamic acid per ml. of said medium.

EXAMPLE 3

[*Corynebacterium herculis* spec. nov. ATCC No. 13868]

Composition of nutrient medium:

| | Percent |
|---|---|
| Glucose | 9.36 |
| $KH_2PO_4$ | 0.05 |
| $MgSO_4 \cdot 7H_2O$ | 0.02 |
| Flour wash water (1% solids) | 30.00 |
| Total urea | 2.20 |

After 168 hours of fermentation the nutrient medium contained 33.7 mg. of L-glutamic acid per ml. of said medium. In this example, instead of all the urea being added at one time at the start of the fermentation, some was added then and the remainder was added subsequently in several increments during the fermentation.

EXAMPLE 4

[*Corynebacterium herculis* spec. nov. ATCC No. 13868]

Composition of nutrient medium:

| | |
|---|---|
| Glucose percent | 4.68 |
| $KH_2PO_4$ do | 0.238 |
| $K_2HPO_4$ do | 0.565 |
| $MgSO_4 \cdot 7H_2O$ do | 0.100 |
| $FeSO_4 \cdot 7H_2O$ do | 0.00011 |
| $MnCl_2 \cdot 4H_2O$ do | 0.00079 |
| $ZnSO_4 \cdot 7H_2O$ do | 0.00015 |
| Urea do | 0.8 |
| Yeast extract do | 0.030 |
| $CaCO_3$ do | 0.100 |
| pH | 7.0 |

After 72 hours of fermentation the nutrient medium contained 12.1 mg. of L-glutamic acid per ml. of said medium.

EXAMPLE 5

[*Corynebacterium herculis* spec. nov. ATCC No. 13868]

Composition of nutrient medium:

| | |
|---|---|
| Glucose percent | 4.68 |
| Peptone do | 0.5 |
| Corn steep liquor do | 0.2 |
| $KH_2PO_4$ do | 0.05 |
| $MgSO_4 \cdot 7H_2O$ do | 0.02 |
| Urea do | 0.8 |
| pH | 7.2 |

After 72 hours of fermentation the nutrient medium contained 7.8 mg. of α-ketoglutaric acid per ml. of said medium.

EXAMPLE 6

[*Corynebacterium herculis* spec. nov. ATCC No. 13868]

Composition of nutrient medium:

| | Percent |
|---|---|
| Glucose | 4.68 |
| $KH_2PO_4$ | 0.05 |
| $MgSO_4 \cdot 7H_2O$ | 0.02 |
| Urea | 1.0 |
| Peptone | 0.5 |
| Corn steep liquor | 0.2 |

After 48 hours of fermentation L-glutamic acid and α-ketoglutaric acid were produced as determined by methods of analyses involving the use of paper chromatography, as disclosed hereinbefore. From the strength of the color developed it was apparent that the amount of α-ketoglutaric acid present was substantially greater than the L-glutamic acid, but that appreciable amounts of both acids were present.

EXAMPLE 7

[*Corynebacterium herculis* spec. nov. ATCC No. 13868]

Composition of nutrient medium:

| | Percent |
|---|---|
| Glucose | 4.68 |
| $KH_2PO_4$ | 0.05 |
| $MgSO_4 \cdot 7H_2O$ | 0.02 |
| Urea | 1.0 |
| Corn steep liquor | 0.2 |

After 48 hours of fermentation L-glutamic acid and α-ketoglutaric acid were produced as determined by methods of analyses involving the use of paper chromatography, as disclosed hereinbefore. From the strength of the color developed it was apparent that the amount of L-glutamic acid present was substantially greater than the α-ketoglutaric acid, but that appreciable amounts of both acids were present.

EXAMPLE 8

[*Corynebacterium herculis* spec. nov. ATCC No. 13868]

Composition of nutrient medium:

| | Percent |
|---|---|
| Glucose | 5.0 |
| $KH_2PO_4$ | 0.05 |
| $MgSO_4 \cdot 7H_2O$ | 0.02 |
| Urea | 0.8 |
| Distillers' dry solubles | 0.1 |

After 72 hours of fermentation the nutrient medium contained 7.1 mg. of L-glutamic acid and 2.19 mg. of α-ketoglutaric acid per ml. of said medium.

EXAMPLE 9

[*Corynebacterium herculis* spec. nov. ATCC No. 13868]

Composition of nutrient medium:

| | Percent |
|---|---|
| Glucose | 4.68 |
| $KH_2PO_4$ | 0.10 |
| $K_2HPO_4$ | 0.20 |
| $MgSO_4 \cdot 7H_2O$ | 0.03 |
| Total urea | 1.0 |
| Flour wash water (1% solids) | 30.0 |

This example was carried out in substantially the same manner as Examples 1–8 above, except that it was on a much larger scale and utilized a stirred fermenter instead of shake flasks. The total urea was added in increments instead of all at the start of the fermentation. Thus 3 liters of the nutrient medium was inoculated with 300-ml. of the liquid stock culture of the microorganism. The aeration rate was 1.0 volume air/volume nutrient medium/minute.

After 72 hours of fermentation the nutrient medium contained 13.7 mg. of L-glutamic acid per ml. of said medium.

EXAMPLES 10, 11 AND 12

[*Corynebacterium herculis* spec. nov. ATCC No. 13868]

Composition of nutrient media:

| Example No. | 10 | 11 | 12 |
|---|---|---|---|
| | Percent | Percent | Percent |
| Glucose | 9.36 | 9.36 | 9.36 |
| $KH_2PO_4$ | 0.03 | 0.03 | 0.03 |
| $K_2HPO_4$ | 0.07 | 0.07 | 0.07 |
| $MgSO_4 \cdot 7H_2O$ | 0.02 | 0.02 | 0.02 |
| Yeast extract | 0.03 | 0.03 | 0.03 |
| Ammonium chloride | [1] 1.42 | None | None |
| Ammonium sulfate | None | [1] 1.76 | None |
| Ammonium tartrate | None | None | [1] 2.45 |

[1] 0.372% nitrogen equivalent.

In Examples 10, 11 and 12, 50-ml. of nutrient medium in 500-ml. Erlenmeyer flasks was used.

After 72 hours of fermentation substantial amounts of L-glutamic acid and α-ketoglutaric acid were produced.

In addition to the foregoing examples we have practiced the present invention under substantially the same conditions as Examples 1–8 above, except using biotin and thiamine as such as the growth-promoting factors. Although we obtained substantial yields of L-glutamic acid and α-ketoglutaric acid using biotin and thiamine as such, at present the other sources of growth-promoting factors disclosed herein are much preferred.

EXAMPLE 13

[*Corynebacterium histidinolovorans* ATCC No. 11442]

Composition of nutrient medium:

| | | |
|---|---|---|
| Glucose | percent | 4.68 |
| $KH_2PO_4$ | do | 0.1 |
| $MgSO_4 \cdot 7H_2O$ | do | 0.05 |
| Urea | do | 0.8 |
| Yeast extract | do | 0.03 |
| $FeSO_4$ | do | 0.000152 |
| pH | | 7.0 |

After 72 hours of fermentation the nutrient medium contained L-glutamic acid as determined by the method of analysis involving the use of paper chromatography, as disclosed hereinbefore.

EXAMPLE 14

[*Corynebacterium fascians* ATCC No. 12975]

Composition of nutrient medium:

| | Percent |
|---|---|
| Glucose | 4.68 |
| $KH_2PO_4$ | 0.05 |
| $MgSO_4 \cdot 7H_2O$ | 0.02 |
| Urea | 1.0 |
| Concentrated flour wash water (5% solids) | 5.0 |

After 72 hours of fermentation the nutrient medium contained L-glutamic acid as determined by the method of analysis involving the use of paper chromatography, as disclosed hereinbefore.

Various embodiments may be made in the above examples within the scope of the present invention defined in the appended claims.

Although we have obtained the best results employing the microorganism *Corynebacterium herculis* spec. nov. ATCC No. 13868 in the production of the organic acids of this invention, microorganisms of the genus Corynebacterium may be used. Likewise, the nutrient medium may be varied considerably from the media shown in the examples. We may use as a nitrogen source various materials, e.g. urea, inorganic ammonium salts including ammonium chloride and ammonium sulfate and also organic ammonium salts including ammonium tartrate; ammonia itself is also applicable. Materials applicable as a carbohydrate source include, e.g. glucose, hydrolyzed starch, sucrose, fructose.

We have found that the microorganisms of the present invention, in general, require the addition of one or more factors for adequate growth. For example, Table 2 given hereinafter illustrates how the growth requirement of *Corynebacterium herculis* spec. nov. ATCC No. 13868 can be satisfied with biotin and thiamine as such. Therefore, in order to cultivate such microorganisms for producing the acids of the present invention, such growth requirements must be satisfied. We have found various sources (herein called "growth-promoting factors sources") which satisfy these growth requirements. Materials applicable as a source of growth-promoting factors include, e.g. corn steep liquor, distillers' dry solubles, peptone, yeast extract, flour wash water, crude protein hydrolyzates, bran solubles and vitamins such as thiamine and biotin.

The amounts of the sources of carbohydrates, nitrogen, and growth-promoting factors are not critical. For optimum results these amounts will depend on a number of factors, including the particular source used. About 1%–15% carbohydrate source material gives good results, but somewhat better results are obtained using 5%–10%. In addition, the amount of nitrogen source depends on the amount of carbohydrate source, so that for best results the amount of nitrogen source should be varied in the same direction as the variation in the carbohydrate source. For example, when using 1%–15% of carbohydrate source, say glucose, 0.5%–4.0% of nitrogen source material gives good results. The amount of growth-promoting factors source may vary widely and is dependent for best results, among other things, on the particular source employed.

Also, as is well known in this art, both the types and amounts of salts can be varied quite widely. The present examples illustrate a large number of applicable salts. Perhaps the more important are the magnesium and phosphate salts, and good results have been obtained with these in amounts of 0.01%–0.1% of $MgSO_4$ and 0.05%–0.8% of $KH_2PO_4$.

The pH range of the nutrient medium during fermentation should be about 5–9 and preferably 7–8.

We prefer to operate at a fermentation temperature of about 30° C. At substantially lower temperatures the rate of fermentation is slower. In most cases it would be undesirable to operate below about 25° C. Generally, there is no appreciable advantage in operating above about 37° C. The microorganisms are apt to be seriously damaged, if not destroyed, at a temperature of about 50° C.

The duration of incubation or fermentation is not critical and may vary quite widely. It is dependent on a number of factors including the inoculum size and amounts of carbohydrate source material employed. In general, as the inoculum size increases, the fermentation time decreases. Usually, as the amount of carbohydrate source material increases, the fermentation time increases. Fermentation time is also dependent somewhat on temperature; the higher the tempertaure the shorter the fermentation time and vice versa. Within these conditions, the present invention is operable employing fermentation times of 12 hours to 192 hours. However, usually about 48 hours to 72 hours will give satisfactory results.

As disclosed hereinbefore, the monosodium salt of L-glutamic acid is widely used as a flavor enhancer. α-Ketoglutaric acid is used as a precursor in the synthesis of L-glutamic acid.

*Table 1*

[Characteristics of *Corynebacterium herculis* spec nov. ATCC No. 13868]

1. Non-motile
2. Gram positive
3. Rod shaped with club shaped swellings and angular arrangement of cells
4. Many of the cells measure between about 0.8–1.1 by 2.2–4.2 microns
5. Agar colonies are punctiform, sometimes of about 2 mm. in diameter, smooth, entire, convex, opaque and of pale yellowish color after a few days
6. The agar stroke is characterized by moderate growth, filiform, glistening, light yellow, butyrous, no odor, medium unchanged
7. Nutrient broth shows the following: moderate clouding, no surface growth, no special odor, scanty viscid sediment
8. Shows marked diversity of form
9. Do not form spores such as characteristically formed by microorganisms of the genus Bacillus
10. Contains granules demonstrable with methylene blue
11. Has growth-promoting factors requirements which can be satisfied with biotin and thiamine
12. Gelatin not liquefied
13. Nitrite produced from nitrate
14. Aerobic
15. Catalase positive
16. Ferments glucose, fructose, mannose, galactose, sucrose, and arabinose with production of acid but no visible gas
17. Very slight acid but no gases produced from dextrin, and maltose 18. No acid and no gas produced from glycerol, lactose, xylose, rhamnose, melibiose, mannitol, paraffin and raffinose
19. Nonthermoduric
20. Does not hydrolze starch
21. Grows well at 30° C. and 37° C.
22. Litmus milk: the reaction is alkaline after 10 days, no peptonization, reduction, or curd formation occurs
23. Methyl red test positive
24. Voges-Proskauer test: does not produce acetylmethyl carbinol
25. Does not utilize citrate as a sole carbon source
26. Produces hydrogen sulfide
27. Non-acid fast
28. Does not hydrolyze fat
29. Does not produce indole spec. nov. ATCC No. 13868 which requires biotin and thiamine in order to grow, said cultivation being carried out until a substantial quantity of L-glutamic acid is produced.

2. Process of preparing L-glutamic acid which comprises cultivating under aerobic conditions in a nutrient medium including a carbohydrate source, a nitrogen source, and a source of growth-promoting factors which supplies at least biotin and thiamine to the nutrient medium *Corynebacterium herculis* spec. nov. ATCC No. 13868 which requires biotin and thiamine in order to grow, said cultivation being carried out until a substantial quantity of L-glutamic acid is produced.

3. Process of claim 2 wherein the carbohydrate source is glucose.

4. Process of claim 2 wherein the carbohydrate source is hydrolyzed starch.

Table 2
GROWTH STUDIES
[*Corynebacterium herculis* spec. nov. ATCC No. 13868]

| Run No. | 1 | 2 | 3 | 4 | 5 | 6 | 7 | 8 | 9 | 10 |
|---|---|---|---|---|---|---|---|---|---|---|
| Composition of Nutrient Medium: | | | | | | | | | | |
| Glucose, percent | 5.0 | 5.0 | 5.0 | 5.0 | 5.0 | 5.0 | 5.0 | 5.0 | 5.0 | 5.0 |
| $KH_2PO_4$ percent | 0.05 | 0.05 | 0.05 | 0.05 | 0.05 | 0.05 | 0.05 | 0.05 | 0.05 | 0.05 |
| $MgSO_4 \cdot 7H_2O$, percent | 0.02 | 0.02 | 0.02 | 0.02 | 0.02 | 0.02 | 0.02 | 0.02 | 0.02 | 0.02 |
| Urea, percent | 1.0 | 1.0 | 1.0 | 1.0 | 1.0 | 1.0 | 1.0 | 1.0 | 1.0 | 1.0 |
| Biotin, millimicrograms/ml | None | 2.0 | None | 2.0 | 1.0 | 100 | None | None | 1.0 | 100 |
| Thiamine, micrograms/ml | None | None | 80 | 80 | None | None | 10 | 1000 | 100 | 100 |
| Growth | No | No | No | Yes | No | No | No | No | Yes | Yes |

In these growth studies the vitamins were added to the nutrient medium prior to inoculation. The nutrient medium was inoculated with 0.1-ml. of an aqueous suspension of washed cells of *Corynebacterium herculis* spec. nov. ATCC No. 13868. In each run growth observations were made several times during the last 54 hours of the 72-hour incubation period.

The L-glutamic acid and the α-ketoglutaric acid are easily separated by conventional means, e.g. by ion exchange technique or by fractional crystallization, from a mixture thereof.

Since the microorganisms of this invention are aerobic, they of course must be aerated. The type and extent of aeration are interdependent with the other conditions of the present invention. From the present disclosure the artisan will have no difficulty insofar as aeration is concerned in practicing this invention.

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. Process of preparing organic acids selected from the group consisting of L-glutamic acid and α-ketoglutaric acid which comprises cultivating under aerobic conditions in a nutrient medium including a carbohydrate source, a nitrogen source, and a source of growth-promoting factors which supplies at least biotin and thiamine to the nutrient medium *Corynebacterium herculis*

5. Process of claim 2 wherein the nitrogen source is urea.

6. Process of claim 2 wherein the nitrogen source is ammonia.

7. Process of claim 2 wherein the source of growth-promoting factors is flour wash water.

References Cited in the file of this patent
UNITED STATES PATENTS

| 3,002,889 | Kinoshita et al. | Oct. 3, 1961 |
| 3,087,863 | Lee et al. | Apr. 30, 1963 |

FOREIGN PATENTS

| 562,728 | Canada | Sept. 2, 1958 |

OTHER REFERENCES

Shiio et al.: The Journal of Biochemistry (Japan), vol. 46, pp. 1597–1605 (1959); vol. 51, pp. 56–62 (1962).

Chen.: Hakko Kogaku Zasshi 37, 295–324 (1959), abstracted in Chemical Abstracts 54, 13536–7 (1960) (photo of each in 195–47).

Kinoshita et al.: Bulletin of the Agricultural Chemical Society of Japan, vol. 22, No. 3, pages 176–185, May 1958, University of Tokyo, 195–47.

Asai et al.: Journal of General Applied Microbiology (Tokyo), vol. 1, pp. 308–46 (1955), abstracted in Chemical Abstracts, vol. 52, 12311f (1958).

Kinoshita et al.: Proceedings International Symposium on Enzyme Chemistry, 1957, published by Maruzen (Tokyo), 1958, pp. 464–468.